United States Patent [19]
Ortega

[11] Patent Number: 5,482,261
[45] Date of Patent: Jan. 9, 1996

[54] NESTED SPRING ASSEMBLY

[75] Inventor: Emilio J. Ortega, Chicago, Ill.

[73] Assignee: Automatic Spring Coiling Co., Chicago, Ill.

[21] Appl. No.: 388,996

[22] Filed: Feb. 15, 1995

[51] Int. Cl.⁶ .................................................. E16F 1/06
[52] U.S. Cl. ............................................ 267/168; 267/166
[58] Field of Search .......................... 267/148, 155–157, 267/166, 168, 90–92; 16/196–198

[56] References Cited

U.S. PATENT DOCUMENTS

| 3,298,337 | 1/1967 | Thompson | 267/168 |
| 3,511,280 | 5/1970 | Mercier. | |
| 3,556,504 | 1/1971 | Sinclair. | |
| 4,148,469 | 4/1979 | Geyer. | |
| 4,186,914 | 2/1980 | Radwill et al. | |
| 4,282,979 | 8/1981 | Friedrichs. | |
| 4,718,868 | 1/1988 | Williams. | |
| 4,854,558 | 8/1989 | Newton | 267/166 |
| 4,907,788 | 3/1990 | Balsells. | |
| 5,203,546 | 4/1993 | Amadore. | |

FOREIGN PATENT DOCUMENTS

| 206230 | 11/1958 | Germany | 267/168 |
| 0213270 | 9/1984 | Germany | 267/168 |

*Primary Examiner*—Robert J. Oberleitner
*Assistant Examiner*—Chris Schwartz
*Attorney, Agent, or Firm*—Wallenstein & Wagner Ltd.

[57] ABSTRACT

The invention is a nested spring assembly. The assembly comprises a first spring and a second spring, and both the first and second springs have an inner and outer surface. The second spring is nested within a cavity formed by the first spring, and the second spring is releasably secured to the first spring by a longitudinal strip of adhesive contacting both the outer surface of the second spring and the inner surface of the first spring.

8 Claims, 1 Drawing Sheet

NESTED SPRING ASSEMBLY

TECHNICAL FIELD

This invention relates to nested spring assemblies for use in various applications, including, but not limited to, automotive transmissions.

BACKGROUND OF THE INVENTION

Nested spring assemblies are commonly used in a variety of applications. Such assemblies generally comprise two springs, one having a larger diameter than the other. The spring having the smaller of the two diameters may be placed within a cavity formed by the spring having the larger of the two diameters.

When the inner diameter of the larger spring is only slightly larger than the outer diameter of the smaller spring, the smaller spring is typically nested tightly within the larger spring, due to an interference-type fit between the two springs.

There are instances, however, when the inner diameter of the larger spring is somewhat larger than the outer diameter of the smaller spring. Under these conditions, the smaller spring may move within the cavity formed by the larger spring.

Moreover, when there is an even larger disparity between the outer diameter of the smaller spring and the inner diameter of the larger spring, there is an increased risk that the smaller spring may become separated from, i.e., fall out of the cavity formed by, the larger spring. This separation may occur during transport of the nested spring assembly from its manufacturer to the ultimate user, or during placement of the nested spring assembly into the device in which it is ultimately intended to be used, such as an automotive automatic transmission, a manual clutch disc, a hydraulic pump, an engine valve train, and various other similar applications.

Such separation is obviously problematic. If the separation occurs during transport, then loss of the second spring can occur, rendering the spring assembly useless for its intended purpose. If the separation of the smaller and larger springs occurs prior to placement into the device in which it is ultimately intended to be used, then manufacturing of the device is at least delayed.

To avoid these problems, and especially the potential for separation, current two-spring assemblies are wrapped in cellophane or other similar wrapping, or are placed in trays or magazines for transport and preparation for assembly. Such wrapping must be removed prior to placement of the nested spring assembly into the automatic transmission or other device, or the springs must be removed from the tray or magazine, slowing and adding to the expense of the manufacture of the automatic transmission or other device. During their removal from the trays or magazines, the springs can be inadvertently separated, and one or both of the two springs could fall to the ground, further slowing the assembly process.

Other prior art known to the Applicant does not effectively solve these problems. For example, U.S. Pat. No. 4,148,469 issued to Geyer on Apr. 10, 1979, and is assigned to Standard Car Truck Company. This patent discloses a dual rate spring system having a primary and secondary spring forming a spring unit. The claims disclose a primary spring that is longer than the secondary spring (Claim 1, Column 3, lines 12–13). The bottom coils of the springs are seated upon a side frame spring seat surface, and are bonded together or encased within a rubber or elastomeric material (Claim 1, Column 3, lines 14–15). This bonding agent provides a yielding, but positive, connection between the lower coils of the two springs (Column 2, lines 28–30). The springs appear to be bonded together by an elastomeric material at their coterminating lower ends. Moreover, the bonding agent provides a permanent connection of the two springs and is not intended to break or dissolve when in use.

U.S. Pat. No. 5,203,546 issued to Amadore on Apr. 20, 1993. This patent discloses a window spring damping apparatus having a coiled spring member slipped over a balance spring which is encased within the bore of a rigid tubular spring cover. The coiled spring member has a varying diameter to engage the bore of the spring cover (Claim 1, Column 3, lines 30–36; and Claim 5, Column 4, lines 24–32). The coiled spring member 10 has a positioning section 22 which has a diameter corresponding to the diameter of the balance spring 12 such that when the coiled spring member is slipped over the balance spring, the turns of the balance spring are retained between the turns of the position section (FIG. 1; and Column 4, lines 1–9). Thus, the coiled spring member is in a relatively fixed position along the length of the balance spring, keeping the balance spring firmly positioned away from the walls of the spring cover 14 (FIG. 1; and Column 4, lines 6–8). This patent teaches a positioning of the two springs to prevent movement. In addition, the claims require a spring cover on either side of the coiled spring member to prevent movement.

U.S. Pat. No. 4,718,868 issued to Williams on Jan. 12, 1988. This patent discloses an annular coiled spring. The annular coiled spring comprises a first coiled metallic spring coupled together by a second coiled metallic spring forming an annular configuration (FIG. 4; and Column 1, lines 48–50). This configuration facilitates electrical contact (Column 2, lines 1–2). The annular coiled spring is adapted to fit around a cylindrical member of an apparatus for electrically connecting together the inner and outer contacts (Column 1, lines 18–22).

U.S. Pat. No. 4,282,979 issued to Friedrichs on Aug. 11, 1981. This patent discloses a force absorbing arrangement having a friction spring, and a device for immediate buffer coupling of rail vehicles, including an elongated housing with one closed end.

U.S. Pat. No. 3,511,280 issued to Mercier on May 12, 1970. This patent discloses a pressure vessel having two coaxial helical springs. The two coaxial helical springs are positioned to provide equal torque effects in opposite directions (Column 6, lines 14–31).

U.S. Pat. No. 3,556,504 issued to Sinclair on Jan. 19, 1971. This patent discloses suspension systems having a spring unit. The spring unit provides different spring rates for a vehicle suspension system in tare and gross load positions, and comprises an inner and outer spring disposed coaxially, one within the other (Column 3, lines 14–15). The spring unit acts in series in the tare condition and in parallel in the gross condition (Column 3, lines 23–25). The inner and outer springs form a spring abutment defining the extension of the two springs, and are separated by an inner telescopic member 24 (Column 3, lines 18–19).

U.S. Pat. No. 4,907,788 issued to Balsells on Mar. 13, 1990. This patent discloses a dual concentric canted-coil spring apparatus. The apparatus has a first annular spring and a second annular spring disposed within the first annular spring. FIG. 15 illustrates the annular coil spring apparatus 400, including a first annular spring 402 having a second annular spring 404 disposed therein in an axial relationship. As can be seen most clearly in FIG. 7b, each spring has a front angle 116 which is greater than the back angle 112. The coils are traced in a circular-like manner about the center line 104.

U.S. Pat. No. 4,186,914 issued to Radwill et al. on Feb. 5, 1980. This patent discloses a dual rate spring device for railroad cars. The dual rate spring comprises a light duty spring disposed within a heavy duty spring (Claim 1, Column 5, lines 45–49; and Claim 4, Column 6, lines 43–44). A spring retainer element 34 (FIG. 1) is loosely positioned between the inner receiving space of the heavy duty spring and the bottom coil convolution of the heavy duty spring to inhibit movement of the spring (Claim 1, Column 2, line 44). The light duty spring has one end disposed within the heavy duty spring and contacts the spring retaining element (Claim 1, Column 4, lines 45–46). The spring retaining element has a lateral slot and is disposed within the inner space of the heavy duty spring (Claim 4, Column 6, lines 37–38). The light duty spring is disposed within the inner space of the heavy duty spring and is in contact with the bottom coil convolution of the heavy duty spring.

SUMMARY OF THE INVENTION

The present invention relates to a new method of securing two coaxial springs together for improved handling after manufacture, and prior to assembly by the user into the device in which the springs are ultimately intended to be used. The present invention also relates to the nested spring assembly formed by that method.

The method is performed by adhesively securing a smaller, second spring to a larger, first spring. The adhesive may be a glue strip which is placed longitudinally along the outer surface, i.e., the outer coils, of the smaller, second spring. The second spring has a slightly smaller outer diameter than the inner diameter of the first, larger spring. The second spring is placed within a cavity formed by that first, larger spring. The adhesive or glue strip which overlays the outer surface of the second, smaller spring also contacts the inner surface of the first, larger spring.

Pressure may be applied to the two springs such that they contact each other along the adhesive or glue strip, and such that they remain in contact until the adhesive or glue strip has cured. After the adhesive or glue strip has cured, the springs are secured together and will not come apart during shipment, storage and assembly by the ultimate user. Thus, the ultimate user has a nested two-spring assembly that is made in a manner which inhibits separation of the inner spring from the outer spring.

The glue strip will break up or dissolve under the normal rigors within the device or machine in which it is ultimately used. In addition, the glue strip will be compatible with its surroundings, so that the material of the glue strip will not adversely affect the operation of the device or machine in which it is used.

For example, if the nested two-spring assembly is used within an automotive transmission, the glue strip will break during elongation or flexing of the springs occurring in connection with the first use of that transmission. The dissolved glue will be of a composition that is compatible with, or at least not deleterious to, automatic transmission fluid.

The invention is also directed to a nested spring assembly. The assembly comprises a first spring and a second spring. The first and second springs each have an inner and outer surface. The second spring is nested within a cavity formed by the first spring, and this second spring is releasably secured to the first spring by a longitudinal strip of adhesive contacting both the outer surface of the second spring and the inner surface of the first spring.

Preferably, the adhesive is made of an ethyl resin base. A suitable adhesive is available from Loctite Corporation, and is sold under the brand "Prism" Instant 454 Gel. This adhesive is clear in color, has a specific gravity of 1.10, and is a viscous, thixotropic gel. It has a gap fill of 0.100 inches, a tensile shear strength of 3,500 psi, and a cure speed of 15–90 seconds (fixture) and twenty-four hours (full). It is usable within a temperature range of –65°–180° F.

The second spring is releasable from its securement to the first spring upon placement of the spring assembly into an apparatus in which the spring assembly is intended to be used. Actuation of the apparatus to cause either a twisting or lengthwise, relative movement of the first and second springs causes the breakup or disintegration of the adhesive or glue strip.

DETAILED DESCRIPTION OF THE PREFERRED EMBODIMENT

The present invention relates to a new method of securing two generally coaxial springs together for improved handling, both after manufacture and prior to assembly by the user into the device in which the resulting nested spring assembly is ultimately intended to be used. The present invention also relates to the nested spring assembly formed by that method.

Figure 1:
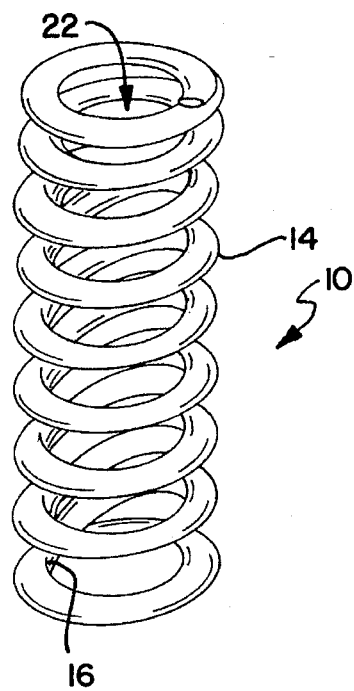
FIG. 1 is a perspective view of a first spring which comprises an outer portion of the nested spring assembly of the invention, and showing the outer and inner surfaces of the first spring.
Figure 4:
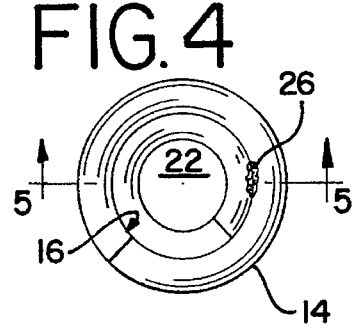
FIG. 4 is a top view of the spring assembly of FIG. 3.
Figure 2:
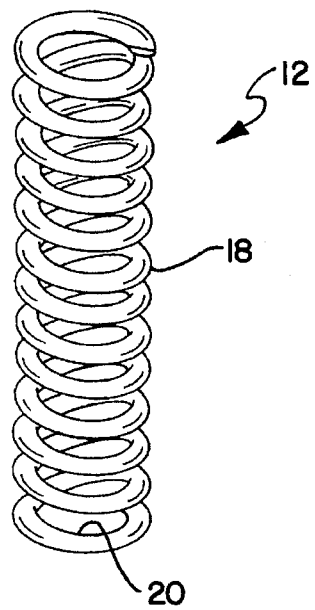
FIG. 2 is a perspective view of a second spring which comprises an inner portion of the nested spring assembly of the invention, and showing the outer and inner surfaces of this second spring.
Figure 5:
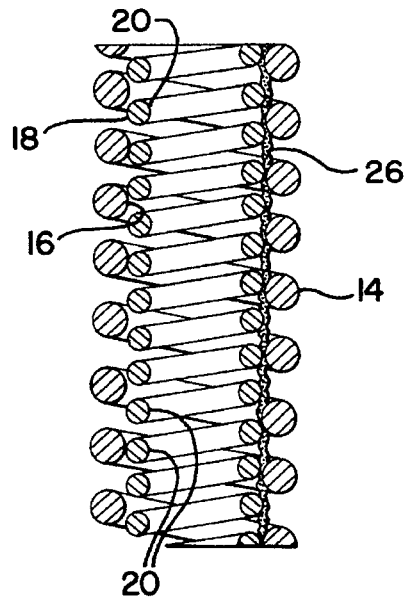
FIG. 5 is a sectional view taken along lines 5—5 of FIG. 4.

The method is performed by adhesively securing a smaller, second spring 12 (FIG. 2) to a larger, first spring (FIG. 1). The adhesive may be a glue strip 26, which may be placed longitudinally along the outer surface 18, i.e., the outer periphery of the spring coils 28, of the smaller, second spring 12 (FIGS. 2 and 4). The second spring 12 has a slightly smaller outer diameter than the inner diameter of the first, larger spring 10. The second spring 12 is placed within a cavity 22 formed by that first, larger spring 10. The adhesive or glue strip 26 which overlays the outer surface 18 of the second, smaller spring 12 also contacts the inner surface 16 of the first, larger spring 10.

Pressure may be applied to the two springs 10 and 12 such that they contact each other along the adhesive or glue strip 26, and such that they remain in contact until the adhesive or glue strip 26 has cured. After the adhesive or glue strip 26 has cured, the springs 10 and 12 are secured together and will not come apart during shipment, storage and assembly by the ultimate user. Thus, the ultimate user has a nested two-spring assembly 24 made in a manner which inhibits separation of the inner spring 12 from the outer spring 10.

The glue strip 26 will break up or dissolve under the normal rigors within the device or machine in which the nested spring assembly 24 is ultimately used. In addition, the glue strip 26 will be compatible with its surroundings, so that the material of the glue strip 26 will not adversely affect the operation of the device or machine in which it is used.

For example, if the nested two-spring assembly 24 is used within an automotive transmission, the glue strip 26 will break during elongation or flexing of the spring assembly occurring in connection with the first use of that transmission. The dissolved glue will be of a composition that is compatible with, or at least not deleterious to, automatic transmission fluid.

As indicated above, the invention is also a nested spring assembly. The actual assembly is made from a first spring 10 and a second spring 12, as shown in FIGS. 1 and 2, respectively. The first spring 10 and second spring 12 both have an inner and outer surface. The outer surface 14 and inner surface 16 of the first spring 10 are shown in FIG. 1, whereas the outer surface 18 and inner surface 20 of the second spring 12 are shown in FIG. 2.

The first spring 10 of FIG. 1 is the larger of the two springs 10 and 12. In fact, the inner diameter of the first spring 10 is preferably slightly larger than the outer diameter of the second spring 12. In this way, the second spring may be inserted within a cavity 22 whose outer boundary is the inner surface 16 of the first spring 10.

Figure 3:
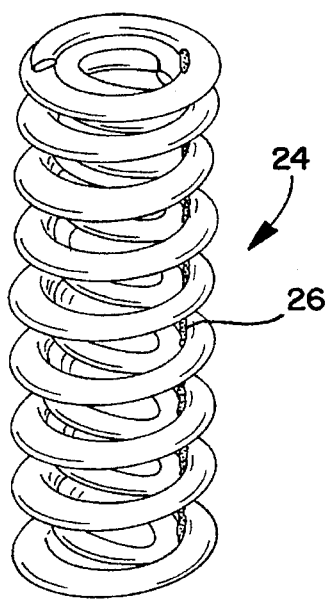
FIG. 3 is a perspective view of the nested spring assembly of the invention.

In the preferred embodiment, the approximate dimensions of the first spring 10 and the second spring 12 are as follows. As may be seen in FIG. 1, the first spring 10 has an overall length (L) of about 2.738 inches, an outer diameter (OD) of about 1.125 inches, and an inner diameter (ID) of about 0.731 inches. As may be seen in FIG. 2, the second spring 12 has an overall length (L) of about 2.638 inches, an outer diameter (OD) of about 0.700 inches, and an inner diameter (ID) of about 0.430 inches. Because the inner diameter of the first spring 10 (0.731 inches) is greater than the outer diameter of the second spring 12 (0.700 inches), the second spring 12 fits within the cavity whose boundary is defined by the inner surface 16 of the first spring 10. The resulting nested relationship of the first spring 10 and second spring 12 is shown in FIG. 3. FIG. 3 also depicts the resulting nested spring assembly 24 in accordance with the invention.

In FIG. 3, the first spring 10 and second spring 12 have been secured together by a strip of adhesive 26. As may be seen in FIG. 2, this strip of adhesive 26 is originally placed on the outer surface 18 of the second spring 12. Prior to curing of the adhesive 26, the second spring 12 is then placed within the cavity 22 formed by the inner surface 16 of first spring 10. After curing, the nested spring assembly 24 is ready for shipment or use.

As may further be seen in FIG. 3, second spring 12 is releasably secured to the first spring 10 by this longitudinal strip of adhesive 26, and the adhesive 26 contacts both the outer surface 18 of the second spring 12 and the inner surface 16 of the first spring 10.

The material which forms the longitudinal strip of adhesive 26 is, at room temperature and pressure, preferably a relatively viscous liquid. The viscosity should be sufficient so that the adhesive strip 26 can, without auxiliary external means, retain its shape and position on outer surface 18 of the second spring 12 after the strip 26 is applied. If the viscosity of the adhesive strip 26 is not sufficient, e.g., if the adhesive has a viscosity close to that of water, then the adhesive would not remain on the outer surface 18 of the second spring 12 for a sufficient time to permit its curing. As a result, the first spring 10 and second spring 12 would not be secured.

One example of the most preferred adhesive suitable for the invention is made from an ethyl resin base. This adhesive is available from Loctite Corporation, and is sold under the brand "Prism" Instant 454 Gel.

After complete curing of the adhesive, the first and second springs of the nested spring assembly 24 are fixedly secured to each other. Thus, the nested spring assembly 24 may be shipped without the need for wrapping that assembly 24 in cellophane, and without the need to place the springs in trays or magazines, as required by the prior art nested spring assemblies to prevent separation of the first spring 10 from the second spring 12. In addition, the nested spring assembly 24 may be handled by personnel who install that assembly 24 into the apparatus in which the assembly 24 is intended to be installed, without (a) fear of the first spring 10 and second spring 12 being separated; and (b) the need for the installer to remove the cellophane or other wrapping prior to installation.

After installation into the apparatus in which the nested spring assembly 24 is to be used, e.g., an automotive automatic transmission, the automatic transmission is typically tested. During such testing, whether off or within the vehicle, the spring assembly 24 typically is flexed or stretched. This flexing or stretching action causes the strip of adhesive to dissolve or disintegrate.

In summary, the second spring 12 is releasable from its securement to the first spring 10 upon placement of the nested spring assembly 24 into the apparatus in which the spring assembly 24 is intended to be used, and actuation of the apparatus to cause either twisting or lengthwise, relative movement of said first spring 10 and second spring 12. At this point, however, the release from securement is not a concern, as the nested spring assembly 24 within such apparatus is typically contained in a pocket which prevents separation of the first spring 10 from the second spring 12.

In addition, the dissolved or disintegrated adhesive strip 26 is made of a material which is either compatible with or at least not deleterious to its environment. For example, in an automotive automatic transmission, the adhesive strip 26 would be compatible with or at least not deleterious to the automatic transmission fluid within that transmission.

While the specific embodiments have been illustrated and described, numerous modifications come to mind without significantly departing from the spirit of the invention, and the scope of protection is only limited by the scope of the accompanying Claims.

What I claim is:

1. A nested spring assembly, said assembly comprising a first spring and a second spring, said first spring having an inner and outer surface, and said second spring having an inner and outer surface, said second spring being nested within a cavity formed by said first spring, and said second spring being releasably secured to said first spring by a longitudinal strip of adhesive contacting both said outer surface of said second spring and said inner surface of said first spring.

2. The nested spring assembly of claim 1, wherein said adhesive is made of an ethyl resin base.

3. The nested spring assembly of claim 1, wherein said second spring is releasable from its securement to said first spring upon placement of said spring assembly into an apparatus in which said spring assembly is intended to be used, and actuation of said apparatus to cause either twisting or lengthwise, relative movement of said first and second springs.

4. The nested spring assembly of claim 1, wherein the material which forms the adhesive is, at room temperature and pressure, a relatively viscous liquid, wherein the viscosity is sufficient so that the adhesive strip can, without auxiliary external means, retain its shape and position after the adhesive is applied and prior to its curing.

5. The nested spring assembly of claim 2, wherein the material which forms the adhesive is, at room temperature and pressure, a relatively viscous liquid, wherein the viscosity is sufficient so that the adhesive strip can, without auxiliary external means, retain its shape and position after the adhesive is applied and prior to its curing.

6. The nested spring assembly of claim 3, wherein the material which forms the adhesive is, at room temperature and pressure, a relatively viscous liquid, wherein the viscosity is sufficient so that the adhesive strip can, without auxiliary external means, retain its shape and position after the adhesive is applied and prior to its curing.

7. A method of temporarily adhesively securing a smaller, second spring to a larger, first spring, wherein said method comprises placing an adhesive strip along the outer surface of the smaller, second spring; placing the second spring within a cavity formed by said first, larger spring; and retaining the first and second springs in a position whereby said adhesive strip is in contact with both of said springs until said adhesive strip is cured.

8. The method of claim 7, wherein said first and second springs are retained in said contacting position by applying pressure to each of said springs.

* * * * *